(12) United States Patent
Gumpoltsberger et al.

(10) Patent No.: US 7,004,878 B2
(45) Date of Patent: Feb. 28, 2006

(54) AUTOMATED MULTIPLE-GEAR TRANSMISSION

(75) Inventors: Gerhard Gumpoltsberger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/688,332

(22) Filed: Oct. 17, 2003

(65) Prior Publication Data

US 2004/0083837 A1 May 6, 2004

(30) Foreign Application Priority Data

Oct. 30, 2002 (DE) .................. 102 50 480

(51) Int. Cl.
*F16H 37/06* (2006.01)

(52) U.S. Cl. .............. 475/218; 475/219; 74/329; 74/331; 74/333

(58) Field of Classification Search ......... 475/209, 475/218, 219; 74/665 R, 329, 331, 333
See application file for complete search history.

(56) References Cited

U.S. PATENT DOCUMENTS 2,853,890 A * 9/1958 Kelbel ............... 74/665 GA
3,429,202 A * 2/1969 Galicher ............... 475/209
3,527,119 A * 9/1970 Nasvytis ............... 475/218
3,572,167 A * 3/1971 Bosko et al. ........... 475/218
3,589,483 A * 6/1971 Smith .................. 192/3.52
4,404,869 A * 9/1983 Numazawa et al. ...... 475/207
5,013,289 A   5/1991 Van Maanen ........... 475/286
5,573,471 A * 11/1996 Shubinsky et al. ....... 475/207

FOREIGN PATENT DOCUMENTS

| DE | 77 06 003 | 6/1978 | |
| DE | 27 08 524 | 1/1981 | |
| DE | 37 07 580 A1 | 10/1987 | |
| DE | 101 45 519 A1 | 4/2003 | |
| JP | 4-46247 | * 2/1992 | .......... 475/218 |

* cited by examiner

*Primary Examiner*—Ha Ho
(74) *Attorney, Agent, or Firm*—Davis & Bujold, P.L.L.C.

(57) ABSTRACT

An automated multiple-gear transmission which includes a single planetary assembly having an annular gearwheel connected to a transmission output shaft, a first input shaft connected to one of the solar gearwheel or the planetary gearwheel web and a second input shaft connected to the other of the solar gearwheel and the planetary gearwheel web. A gearwheel assembly is connected from a transmission input shaft and includes a single countershaft and plurality of transmission ratio gearsets and a plurality of shift control elements for selectively connecting the first and second planetary assembly input shafts to the transmission ratio gearsets and a transmission housing.

10 Claims, 2 Drawing Sheets

AUTOMATED MULTIPLE-GEAR TRANSMISSION

The present invention concerns an automated multiple-gear transmission with an input shaft, a gearwheel assembly for shifting gears through several output paths, and an output shaft.

Automatic transmissions, which have already been known for a long time, are mainly based on the principle of conventional, manual transmissions of countershaft structure, in which a gear shift is carried out with the aid of synchromesh devices. Such transmissions have relatively small shift control elements, but the performance determining elements, such as spur gear stages, take up a large structural space and are also cost intensive.

In relation to their structure an essentially more compact form are the long known change-under-load automatic transmissions with planetary gearwheel assemblies, which can comprise internal branching of the power. Although such transmissions take up relatively little structural space because of their compact structure, their disadvantage is that the shift control elements, such as clutches and brakes, have to be relatively large and hydraulically actuated. This leads to considerable drag losses and correspondingly high actuation energy with a negative effect on the efficiency of the transmission.

Further, transmission types have long been known which seek to combine the advantages of countershaft transmissions together in relation to their small shift control elements and the advantages of change-under-load automatic transmission with planetary gear assemblies in relation to compact gearing, in that a planetary auxiliary assembly is provided in a countershaft transmission, such that a range-change transmission with purely geometrical progression is formed. A problem with this, among others, is that the gear progression in low gears is very small, while in higher gears it is very large, which makes the driving of passenger vehicles more difficult.

Another transmission structure is the so-termed power-branching or multiple-range transmission, which can give numerous driving ranges with few shift control elements.

A combination of the features of the transmission types described above is realized in a transmission described in U.S. Pat. No. 5,013,289, which has a countershaft transmission zone and two planetary gearwheel assemblies. Between a transmission input shaft and an output not coaxially aligned therewith, three output paths are provided in which the transmission ratio can be changed in change-under-load mode. By providing three output paths that can be connected to the planetary gearwheel assemblies, six forward gears can be produced with relatively few shift control elements.

This, however, still has the disadvantage that the change-under-load requires the use of multiple-disc couplings, with correspondingly large effort and expenditure on the construction of the hydraulic controls and regulation system. A further disadvantage is that to supply the elaborate hydraulic system a high-pressure hydraulic pump must be provided which, with the drag losses that occur, leads to a reduction of the system efficiency.

To avoid these disadvantages, DE 101 45 519.4 by the present applicant has already proposed an automated multiple-gear vehicle transmission in which several output paths are provided between an input shaft and an output shaft for engaging the gears, these being summed in a planetary gearwheel summation transmission, such that in at least one of the output paths the transmission ratio can be varied in steps, and in which at least one transmission ratio can be engaged in a form-locked way. This multiple-gear vehicle transmission offers the advantage that its structure is simpler than those of planetary change-under-load automatic transmissions, because an elaborate hydraulic system for the shift control elements can be dispensed with at least in part. This transmission in its various versions is designed as a six-gear transmission with one reverse gear.

The purpose of the present invention is to provide an automated multiple-gear transmission with which at least eight forward gears and two reverse gears can be engaged, and which is of shorter structure, lighter, and can be manufactured more cheaply than the conventional range-change transmissions.

Beginning with an automated multiple-gear transmission of the type described initially, this objective is achieved by the features specified in the characterizing portion of claim 1; advantageous particulars are described in the subordinate claims.

According to the invention, it is provided that the gearwheel assembly consists of several intermediate spur gear stages and a subsequent planetary assembly. In particular, the gearwheel assembly consists of four independent spur gear transmission ratios and a three-shaft planetary assembly, two of the three shafts being connected to the spur gear transmission ratios via shift control elements or even directly, while the third shaft of the planetary assembly serves as a transmission output.

The automated multiple-gear transmission, according to the invention, is an eight-gear transmission with two reverse gears and, at least when mounted in the vehicle in the standard way, shows better efficiency because in several of the gears the power is transferred directly. The load on individual gear systems is lower, because in the power-branched gears less power is transmitted via the spur gearing.

Since conventional 2×4 range-change transmissions of pure spur gear construction, which are made as eight-gear transmissions, have at least six spur gear planes and since 4×2 range-change transmissions with planetary range changes need at least five spur gear planes and a planetary assembly, the saving of one gearwheel plane makes it possible for the automatic multiple-gear transmission, according to the invention, to be of shorter structure, lighter, and more cheaply manufactured.

Finally, it should also be mentioned that the transmission, according to the invention, enables a progressive stepping of the transmission ratios and so a better adaptation of the traction force delivered, to the traction force needed, compared with geometrically staged transmissions, i.e,. range-change transmissions which are already geometrically stepped because of their structure, in which all the ratio transitions are of the same size.

Below, the invention is explained in more detail with reference to the drawing which illustrates preferred example embodiments and which shows:

As is apparent from the Figures, the automated multiple-gear transmission, according to the invention, with which eight forward gears and two reverse gears can be engaged and which is suitable both for passenger cars and for light, medium and heavy goods vehicles, consists essentially of a gearwheel assembly comprising several intermediate spur gear stages and an auxiliary planetary assembly. The gearwheel assembly itself consists of four independent transmission ratios i1, i2, i3 and i4, which are formed as spur gear transmission ratios or as direct shaft connections, and of a three-shaft planetary assembly PS in which two of the three shafts can be connected via shift control elements or directly to the transmission ratios i1 to i4, while one of the three shafts serves as the transmission output. An essential feature of this is that at any time three shift control elements must be engaged.

Figure 4:
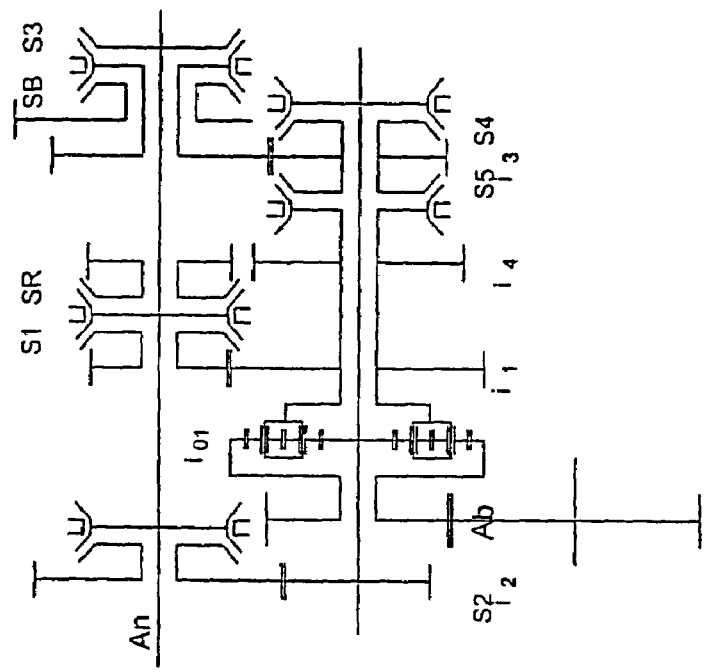
FIG. 4 is a second example embodiment for the front, transverse arrangement in a vehicle.
Figure 1:
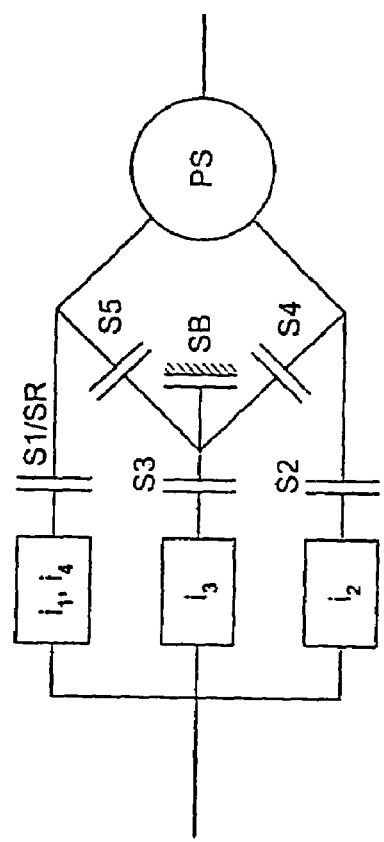
FIG. 1 is a principle of the structure of an automated multiple-gear transmission according to the invention.
Figures 2, 3:
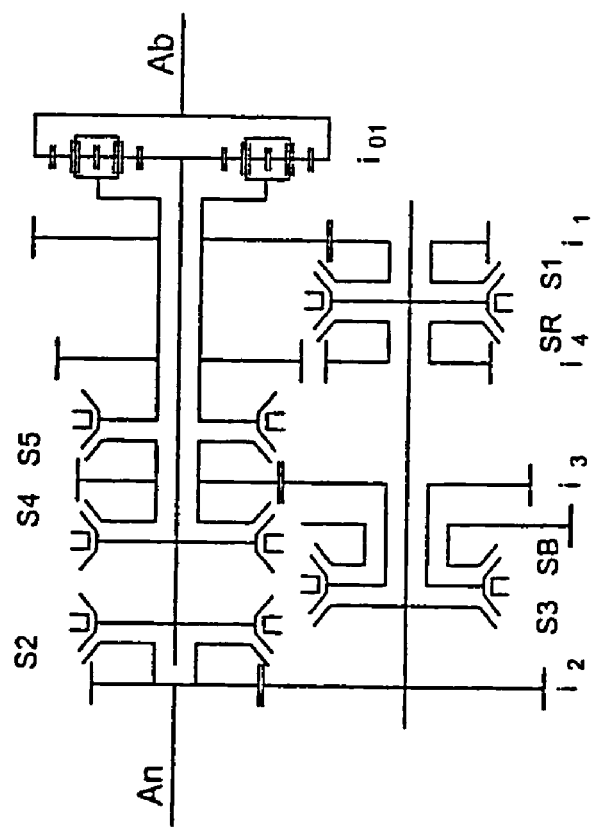
FIG. 2 is a first example embodiment of the standard arrangement in a vehicle.
FIG. 3 is the gear-shift scheme associated with FIG. 2.

As can be seen from FIGS. 2 and 4, two of the spur gear transmission ratios i1 and i4 are connected to a shaft of the planetary assembly PS via shift control elements S1, SR, such that the transmission ratio i4 reverses the rotation direction so that a reverse gear is engaged thereby.

One of the spur gear transmission ratios i2 is connected via a shift control element S2 with another shaft of the planetary assembly PS, and in the standard fitting mode into a motor vehicle, i.e., in the longitudinal direction, this transmission can even be one-to-one, giving direct throughput, since the transmission ratio i2 is a constant transmission ratio of the associated countershaft. A further spur gear transmission ratio i3 can be connected on the primary side both with the drive, via a shift control element S3 and with the housing SB. On the secondary side, this spur gear transmission ratio i3 is connected both to the first shaft of the planetary assembly via the shift control element S5 and to the second shaft of the planetary assembly via the shift control element S4.

The planetary assembly PS can be made as a planetary assembly of any type. In the preferred example embodiment illustrated, a plus planetary assembly is used, i.e., a planetary transmission with a positive static gear transmission ratio with a dual planetary gear, in which the output takes place at the annular gearwheel, while i1 and i4 act on the solar gearwheel or the web and in contrast thereto i2 acts on the web or the solar gearwheel. It is also possible to use a minus planetary assembly, in which the output takes place at the web and i1 and i4 act on the solar gearwheel or on the annular gearwheel and in contrast i2 acts on the annular gearwheel or on the solar gearwheel. Other possible designs for the planetary assembly are a bevel gear planetary assembly or a cone gear planetary assembly.

The shift control elements S1 to S5 can be made as form-locking shift control elements, for example as synchromeshes or claw couplings. In this, some can even be assembled in packets, for example, shift control elements S1–SR, S2–SB. The shift control elements can also be made as frictional change-under-load elements, enabling the transmission to change under load. In each case the shift control elements can be arranged before or after the associated spur gear transmission ratio.

Further, it is also possible to equip the transmission either with a single countershaft or with two countershafts of the same type.

As can be seen, from the functional scheme shown in FIG. 3, the second, sixth, eighth forward gears and the second reverse gears can be formed directly by the respective transmission ratios i1 to i4. By locking one shaft of the planetary assembly by means of the shift control element SB, additional transmission ratios can be realized by means of the spur gear transmission ratios i2, i3 and i4 and, in this case, the planetary assembly acts as an auxiliary group so as to engage the first and third forward gears and the first reverse gear.

At the same time, the power can flow, via the spur gear transmission ratios, and can be transferred into the planetary assembly, via the first and second shafts of the planetary assembly, where it is summed again and additional transmission ratios are produced. By virtue of this power branching, the fourth, fifth and seventh forward gears can be engaged.

Other transmission ratios are also conceivable if, instead of i1, the spur gear transmission ratio i4 is combined with other spur gear transmission ratios.

In contrast to the conventional 2×4 range-change transmissions of purely spur gear construction, which comprise at least six spur gear planes, and the conventional 4×2 range-change transmissions with a planetary range group, which comprise at least five spur gear planes and a planetary assembly, the automated multiple-gear transmission, according to the invention, is a shorter and lighter structure and is, therefore, less costly to manufacture. The power branching enables higher efficiency in the standard fitting position compared with the above conventional eight-gear transmissions since, in several gears, the power is directly transferred.

| Reference numerals | |
|---|---|
| i1 | Spur gear transmission ratio |
| i2 | Spur gear transmission ratio |
| i3 | Spur gear transmission ratio |
| i4 | Spur gear transmission ratio |
| S1 | Shift control element |
| S2 | Shift control element |
| S3 | Shift control element |
| S4 | Shift control element |
| S5 | Shift control element |
| SR | Shift control element |
| SB | Shift control element |
| PS | Planetary assembly |
| An | Input shaft |
| Ab | Output shaft |

What is claimed is:

1. An automated multiple-gear transmission with an input shaft, a gearwheel assembly to engage gears, via several output paths, an output shaft, and an auxiliary three-shaft planetary assembly;
   wherein the gearwheel assembly comprises at least four intermediate independent spur gear stages, which are formed as spur gear transmission ratios (i) and that can be connected to two of the three auxiliary shafts of the planetary assembly (PS) directly or via a shift control;
   first and fourth spur gear transmission ratios (i1, i4) are connected via first shift and reverse control elements (S1, SR) to the first shaft of the planetary assembly (PS), a second spur gear transmission ratio (i2) is connected via a second shift control element (S2) to the second shaft of the planetary assembly (PS) and a third spur gear transmission ratio i3) is connected on a primary side via a third shift control element to a drive shaft and via a sixth shift control element to a housing (SB) and on a secondary side to the first shaft of the planetary assembly (PS) via a fifth shift control element (S5) and to the second shaft of the planetary assembly (PS) via a fourth shift control element (S4).

2. The multiple-gear transmission according to claim 1 wherein a third shaft of the planetary assembly (PS) is connected to the output shaft.

3. The multiple-gear transmission according to claim 1, wherein the planetary assembly is a plus planetary assembly, whose drive takes place at an annular gearwheel, such that the first and fourth spur gear transmission ratios (i1, i4) are in active engagement with a solar gearwheel or with a web, while the second spur gear transmission ratio (i2) is in active engagement with one of the web and the solar gearwheel.

4. The multiple-gear transmission according to claim 1, wherein the planetary assembly is a minus planetary assembly, whose drive takes place at a web, such that the first and second spur gear transmission ratios (i1, i2) are in active engagement with one of a solar gearwheel and with an annular gearwheel, while the second spur gear transmission ratios (i2) is in active engagement with one of the annular gearwheel and with the solar gearwheel.

5. The multiple-gear transmission according to claim 1, wherein the shift control elements are made as form-locking shift control elements designed as one of synchromeshes and as claw couplings.

6. The multiple-gear transmission according to claim 1, wherein the shift control elements are frictional change-under-load elements.

7. The multiple-gear transmission according to claim 1, wherein the shift control elements are arranged before associated spur gear transmissior ratios.

8. The multiple-gear transmission according to claim 1, wherein the shift control elements are arranged after associated spur gear transmission ratios.

9. The multiple-gear transmission according to claim 1, wherein the transmission comprises a countershaft.

10. The multiple-gear transmission according to claim 1, wherein the transmission comprises two countershafts of a same type.

* * * * *